United States Patent
Tamagawa

(10) Patent No.: US 8,130,412 B2
(45) Date of Patent: Mar. 6, 2012

(54) COLOR IMAGE PROCESSING METHOD AND APPARATUS CAPABLE OF REDUCING THE NUMBER OF APPLICATION OF COLOR MATERIALS

(75) Inventor: Kiyomi Tamagawa, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 647 days.

(21) Appl. No.: 12/147,031

(22) Filed: Jun. 26, 2008

(65) Prior Publication Data
US 2009/0033956 A1    Feb. 5, 2009

(30) Foreign Application Priority Data
Jul. 30, 2007    (JP) ................................. 2007-197698

(51) Int. Cl.
*H04N 1/60* (2006.01)
(52) U.S. Cl. ............... 358/1.9; 358/518; 347/9; 347/14; 347/15; 347/212
(58) Field of Classification Search .................. None
See application file for complete search history.

(56) References Cited

U.S. PATENT DOCUMENTS

| | | | | |
|---|---|---|---|---|
| 4,590,515 | A * | 5/1986 | Wellendorf | 358/500 |
| 4,704,615 | A * | 11/1987 | Tanaka | 347/212 |
| 6,808,244 | B2 * | 10/2004 | Rosenberger et al. | 347/15 |
| 6,816,179 | B2 * | 11/2004 | Hanyu | 347/131 |
| 7,196,817 | B2 * | 3/2007 | Couwenhoven et al. | 358/1.9 |
| 7,237,861 | B2 * | 7/2007 | Suzuki et al. | 347/15 |
| 7,298,527 | B2 * | 11/2007 | Yabe | 358/1.9 |
| 7,583,421 | B2 * | 9/2009 | Watanabe | 358/518 |
| 7,596,262 | B2 * | 9/2009 | Kobayashi | 382/162 |
| 7,719,714 | B2 * | 5/2010 | Tsuji | 358/1.9 |
| 7,884,965 | B2 * | 2/2011 | Yoshida | 358/1.9 |
| 7,961,354 | B2 * | 6/2011 | Eguchi | 358/2.1 |
| 2004/0189728 | A1 * | 9/2004 | Nakajima | 347/14 |

(Continued)

FOREIGN PATENT DOCUMENTS

JP    10-129013 A    5/1998

(Continued)

OTHER PUBLICATIONS

Rejection of the Application, dated Nov. 29, 2011, issued in corresponding JP Application No. 2007-197698, 3 pages in English and Japanese.

*Primary Examiner* — King Poon
*Assistant Examiner* — Dung Tran
(74) *Attorney, Agent, or Firm* — Sughrue Mion, PLLC

(57) ABSTRACT

When a color image is formed on a transparent sheet with a white color material as background color material and C, M, Y, K color materials as process color materials and has colors determined by the total amount of the color materials that are applied per unit area, image formation failures such as ink drooping and ink fixation failures are prevented from occurring. Of four colors or more including white represented by a CMYKW 1-bit pixel signal, the three colors C, M, Y (gray) are replaced with the color K. After the replacement, for three or more of C, M, Y, K, no white color ink is applied since the transparent sheet is opaque without the white color ink. This control process is effective to reduce the number of applications, i.e., the total amount of inks applied, thereby preventing image formation failures such as ink drooping from occurring.

5 Claims, 5 Drawing Sheets

U.S. PATENT DOCUMENTS

| | | | |
|---|---|---|---|
| 2006/0250427 A1* | 11/2006 | Kroon et al. | 347/9 |
| 2007/0201062 A1* | 8/2007 | Watanabe | 358/1.9 |
| 2007/0216920 A1* | 9/2007 | Watanabe | 358/1.9 |
| 2007/0216921 A1* | 9/2007 | Watanabe | 358/1.9 |
| 2007/0216924 A1* | 9/2007 | Watanabe | 358/1.9 |
| 2008/0211866 A1* | 9/2008 | Hill | 347/42 |
| 2008/0225312 A1* | 9/2008 | Ogawa | 358/1.9 |

FOREIGN PATENT DOCUMENTS

| | | |
|---|---|---|
| JP | 2002-38063 A | 2/2002 |
| WO | WO 2006/087583 A1 | 8/2006 |

* cited by examiner

FIG. 3

| 1 COLOR | 00001 (WHITE) |
|---|---|
| 2 COLORS | 10001 (CYAN), 01001 (MAGENTA), 00101 (YELLOW), 00011 (BLACK) |
| 3 COLORS | 11001 (BLUE), 10101 (GREEN), 01101 (RED), 10011 (CYAN + BLACK), 01011 (MAGENTA + BLACK), 00111 (YELLOW + BLACK) |
| 4 COLORS | 11101 (GRAY), 11011 (BLUE + BLACK), 10111 (GREEN + BLACK), 01111 (RED + BLACK) |
| 5 COLORS | 11111 (GRAY + BLACK) |

| COLOR | PIXEL SIGNAL CMYKW | INK DOT CONTROL SIGNAL CMYKW |
|---|---|---|
| WHITE | 00001 | 00001 |
| CYAN | 10001 | 10001 |
| MAGENTA | 01001 | 01001 |
| YELLOW | 00101 | 00101 |
| BLACK | 00011 | 00011 |
| BLUE | 11001 | 11001 |
| GREEN | 10101 | 10101 |
| RED | 01101 | 01101 |
| CYAN + BLACK | 10011 | 10011 |
| MAGENTA + BLACK | 01011 | 01011 |
| YELLOW + BLACK | 00111 | 00111 |
| GRAY | 11101 | 00011 |
| BLUE + BLACK | 11011 | 11010 |
| GREEN + BLACK | 10111 | 10110 |
| RED + BLACK | 01111 | 01110 |
| GRAY + BLACK | 11111 | 00021 |

COLOR IMAGE PROCESSING METHOD AND APPARATUS CAPABLE OF REDUCING THE NUMBER OF APPLICATION OF COLOR MATERIALS

BACKGROUND OF THE INVENTION

1. Field of the Invention

The present invention relates to an image processing method and apparatus applicable to an image output device for forming, on a base such as a sheet or the like, a color image of process color materials {C (cyan), M (magenta), Y (yellow), and K (black)} and a base color material, e.g., W (white), whose colors are determined by the total amount of color materials that are applied per pixel, and a CPU-readable recording medium storing therein a program for carrying out such an image processing method.

2. Description of the Related Art

Electrophotographic printers which employ toners as color materials, and image output devices (image forming devices) such as ink jet printers or the like and printing presses which employ inks as color materials operate to form an image on a sheet (a support or a recording medium) of paper (printing paper) by applying color materials per pixel.

The colors of the image formed on the sheet are affected by the background color of the sheet. There has been proposed the technology of an ink jet printer for forming a desired color image on a yellowish white sheet such as a recycled sheet of paper, a postal card, or the like while preventing the color image from being affected by the yellowish white which is the background color of the sheet (see Japanese Laid-Open Patent Publication No. 2002-038063).

According to the proposed technology, a white ink is applied from an ink set to a yellowish white sheet and then dried to turn the background color of the yellowish white sheet into white. Thereafter, process inks including yellow, magenta, light magenta, cyan, light cyan, black, etc. are applied from the ink set additively to form a color image on the sheet.

In reality, the total amount of color materials that can be applied to or added on the sheet per pixel is fixed for each image output device. The range of C, M, Y, K values that can be adopted in an image output device depends on the total amount of color materials used in the image output device.

For example, as shown in FIG. 5A of the accompanying drawings, if each of the four color materials C, M, Y, K can be applied up to 100% on a sheet S per unit area, then the upper limit of the total amount of color materials is 400% {(C, M, Y, K)=(100, 100, 100, 100)}.

If the total amount of color materials has an upper limit of 300%, then, as shown in FIG. 5B, each of the four color materials C, M, Y, K can be applied up to 75% on a sheet S. In this case, although not shown, if the color material C is applied by 100%, then the sum of the remaining three color materials M, Y, K is limited to 200%.

If color materials are applied in excess of a total amount of 100% and tend to droop, as shown in FIG. 5C of the accompanying drawings, then the total amount of color materials is limited to an upper limit of 100%.

In the description of the present specification, the amount of a color material is expressed in a range from 0% to 100% which corresponds to a gradation range of 8-bit image data from a gradation level 0 to a gradation level 255. Specifically, the maximum gradation level 255 corresponds to 100%, the minimum gradation level 0 corresponds to 0%, and the intermediate gradation level 127 corresponds to 50%. The percentage % may be considered to be halftone dot %. If the image data represent a halftone image, then each halftone dot cell comprises a plurality of pixels.

When a white ink is applied to the entire surface of an image forming area on a sheet as disclosed in Japanese Laid-Open Patent Publication No. 2002-038063, since the total amount of inks that can be applied on the sheet is finite in reality, the inks can be applied only in a certain range, tending to result in image formation problems that inks droop and cannot be fixed in place. Nevertheless, Japanese Laid-Open Patent Publication No. 2002-038063 does not refer to anything addressed to the above problems.

SUMMARY OF THE INVENTION

It is an object of the present invention to provide an image processing method and apparatus for preventing image formation problems that color materials droop and cannot be fixed in place, in a process of forming, on a sheet, a color image with a background color material and process color materials, the color image being determined by the total amount of color materials applied per pixel.

According to the present invention, there is provided an image processing method applicable to an image output device for forming a color image on a sheet with a background color material and process color materials, the color image having colors determined by the total amount of the color materials that are applied per pixel, the image processing method comprising a process of determining a total amount of the background color material and the process color materials which are applied per pixel based on an input pixel signal, and a number-of-application adjusting process of, if the determined total amount of the color materials is of a value in excess of a total-amount-of-color-material upper limit for the image output device for applying the color materials per pixel, reducing the number of applications of the background color material or the process color materials without color changes, so that the total amount of the color materials is equal to or lower than the total-amount-of-color-material upper limit.

According to the present invention, there is also provided an image processing apparatus applicable to an image output device for forming a color image on a sheet with a background color material and process color materials, the color image having colors determined by the total amount of the color materials that are applied per pixel, the image processing apparatus comprising means for determining a total amount of the background color material and the process color materials which are applied per pixel based on an input pixel signal, and number-of-application adjusting means for, if the determined total amount of the color materials is of a value in excess of a total-amount-of-color-material upper limit for the image output device for applying the color materials per pixel, reducing the number of applications of the background color material or the process color materials without color changes, so that the total amount of color materials is equal to or lower than the total-amount-of-color-material upper limit.

With the image processing method and the image processing apparatus described above, when the color image is formed on the sheet with the background color material and the process color materials and has colors determined by the total amount of the color materials that are applied per pixel, the total amount of the background color material and the process color materials which are applied per pixel is determined based on an input pixel signal, and if the determined total amount of the color materials is of a value in excess of a total-amount-of-color-material upper limit for the image device for applying the color materials per pixel, the number of applications of the background color material or the process color materials is reduced without color changes, so that the total amount of the color materials is equal to or lower than the total-amount-of-color-material upper limit. When the color image is formed on the sheet, image formation failures such as ink drooping and ink fixation failures are prevented from occurring.

According to the present invention, there is further provided a CPU-readable recording medium storing therein a program executable by a CPU, and applicable to an image output device for forming a color image on a sheet with a background color material and process color materials, the color image having colors determined by the total amount of the color materials that are applied per pixel, the program executed by the CPU comprising a step of determining a total amount of the background color material and the process color materials which are applied per pixel based on an input pixel signal, and a number-of-application adjusting step of, if the determined total amount of the color materials is of a value in excess of a total-amount-of-color-material upper limit for the image output device for applying the color materials per pixel, reducing the number of applications of the background color material or the process color materials without color changes, so that the total amount of the color materials is equal to or lower than the total-amount-of-color-material upper limit.

Furthermore, the number of applications of the process color materials is determined, and if the determined number of applications of the process color materials is three or more, the background color material is not applied, thereby reducing the number of applications.

If the background color material comprises a white color material, the process color materials comprise C, M, Y, K color materials, and the total-amount-of-color-material upper limit corresponds to the number of application upper limit of three, then when the number of applications for a certain pixel is four for applying the white color material once and applying each of the C, M, Y color materials once, the number of applications is reduced to two for applying the white color material once and applying the K color material once, when the number of applications for a certain pixel is four for applying the white color material once, applying the K color material once, and applying two of the C, M, Y color materials once, the number of applications is reduced to three without adding the white color material, and when the number of applications for a certain pixel is five for applying the white color material once and applying each of the C, M, Y, K color materials once, the number of applications is reduced to three for applying the white color material once and the K color material twice. In this manner, the number of applications can be kept below the upper limit of three.

The sheet on which the color image is formed is preferably a transparent sheet.

According to the present invention, if the total amount of the background color material and the process color materials that are to be applied per pixel is of a value in excess of the total-amount-of-color-material upper limit for the image device for applying the color materials per pixel, the number of applications of the background color material or the process color materials is reduced without color changes, so that the total amount of color materials will not exceed the total-amount-of-color-material upper limit. Consequently, when the color image is formed on the sheet, image formation failures such as ink drooping and ink fixation failures are prevented from occurring.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table showing representations of a CMYK 1-bit pixel signal;

FIG. 4 is a diagram showing details of a 1-bit conversion table for converting a pixel signal into an ink dot control signal;

DESCRIPTION OF THE PREFERRED EMBODIMENT

An embodiment of the present invention will be described below with reference to the drawings.

Figure 1:
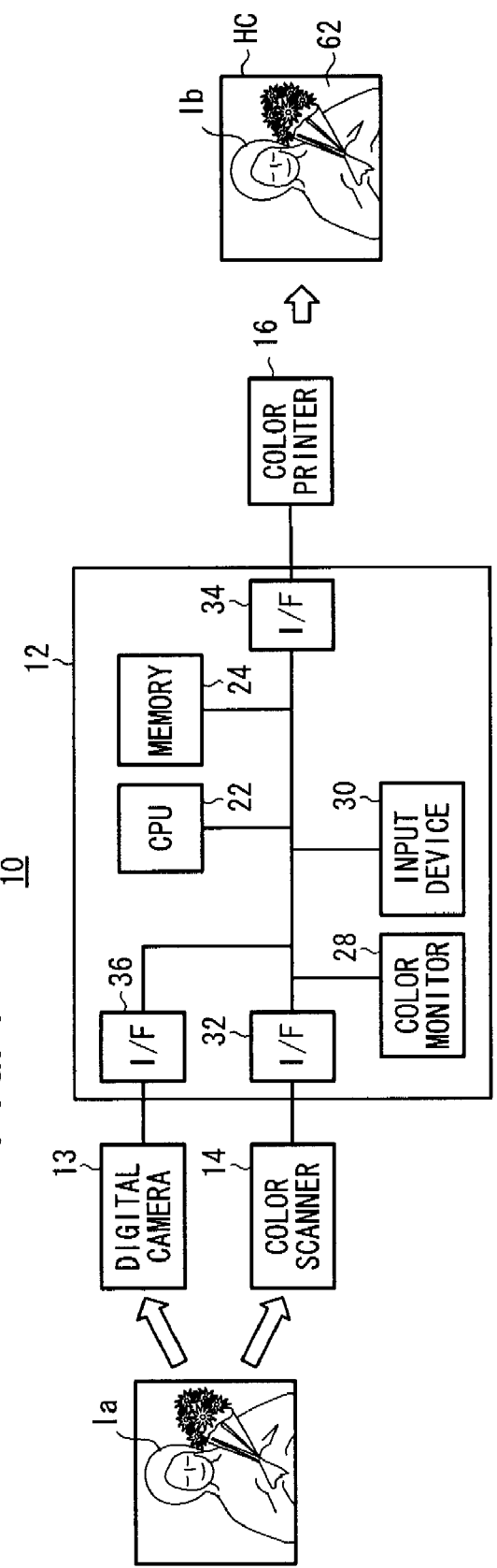
FIG. 1 is a block diagram of an image reproducing system to which an image processing method and apparatus according to an embodiment of the present invention are applied.

FIG. 1 shows in block form an image reproducing system 10 to which an image processing method and apparatus according to an embodiment of the present invention are applied.

As shown in FIG. 1, the image reproducing system 10 basically comprises a personal computer 12, image input devices (image input apparatus) such as a digital camera (color digital camera) 13 and a color scanner 14 which are connected to the personal computer 12, and an image output device (image output apparatus, image forming apparatus) such as a color printer 16. The color printer 16 may comprise an ink jet printer or an electrophotographic printer, for example. In the present embodiment, the color printer 16 comprises an ink jet printer.

The digital camera 13 captures a color image Ia of a subject and sends an RGB 8-bit signal, as a color image signal, representing the color image Ia through an interface 36 to the personal computer 12. The RGB 8-bit signal refers to 8-bit device signals representing images in three colors R, G, B.

The color scanner 14 reads a color image Ia from a color original such as a color reversal film or the like and sends a CMYK 8-bit signal, as a color image signal, representing the color image Ia through an interface 32 to the personal computer 12. The CMYK 8-bit signal refers to 8-bit device signals representing images in four colors C, M, Y, K.

The personal computer 12 includes a CPU 22, a memory 24, a color monitor 28, and an input device 30 including a keyboard, a mouse, etc. which are connected to each other by a bus. The personal computer 12 also includes the interface 36 for receiving the device RGB 8-bit signal from the digital camera 13, the interface 32 for receiving the device CMYK 8-bit signal from the color scanner 14, and an interface 34 for supplying a CMYKW 1-bit ink dot control signal, which is determined per pixel, to the color printer 16. The CMYKW 1-bit ink dot signal refers to 1-bit signals representing images in five colors C, M, Y, K, W (white).

The memory 24 comprises a DRAM (main memory) and a flash memory (rewritable nonvolatile memory). The CPU 22 operates as various function realizing means when it executes programs stored in the memory 24 based on various input signals applied to the CPU 22.

Figure 2:
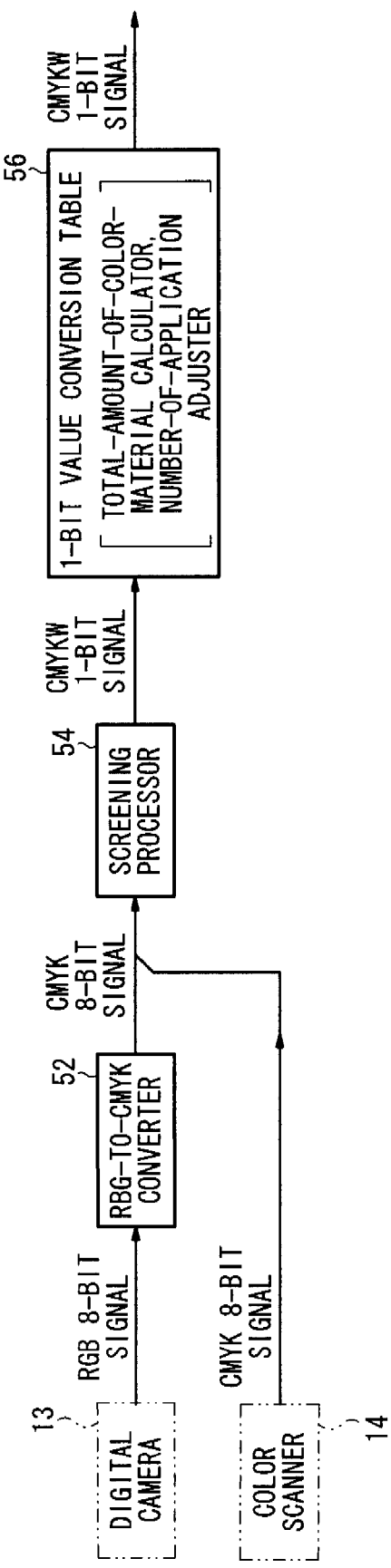
FIG. 2 is a block diagram of function realizing means executed by a CPU.
Figure 5A:
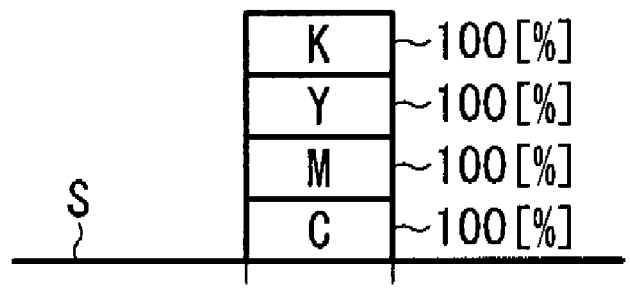
FIG. 5A is a diagram showing that the total amount of color materials per pixel has an upper limit of 400%.
Figure 5B:
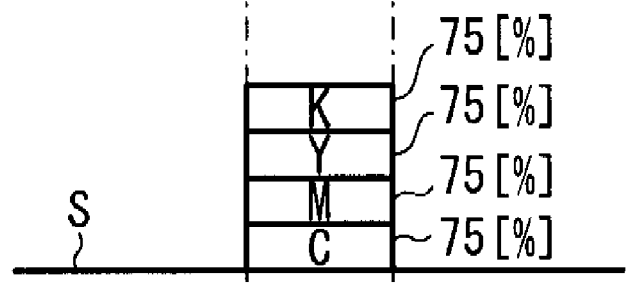
FIG. 5B is a diagram showing that the total amount of color materials per pixel has an upper limit of 300%.
Figure 5C:
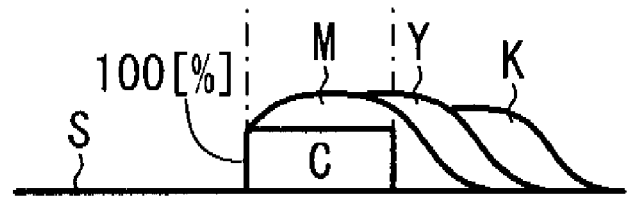
FIG. 5C is a diagram showing the manner in which inks droop when the total amount of color materials per pixel has an upper limit of 100%.

As shown in FIG. 2, the CPU 22 functions as an RGB-to-CMYK converter 52, a screening processor 54, and a 1-bit value conversion table 56 (total-amount-of-color-material calculator, adjuster).

The RGB-to-CMYK converter 52 converts the RGB 8-bit signal supplied from the digital camera 13 through the interface 36 into a CMYK 8-bit signal.

The screening processor 54 performs a screening process (AM screening process or FM screening process) on the CMYK 8-bit signal from the RGB-to-CMYK converter 52, and outputs a CMYK 1-bit pixel signal which is an image signal to be adjusted for its number of applications.

The 1-bit value conversion table 56 adjusts the number of applications of the CMYK 1-bit pixel signal from the screening processor 54 according to predetermine rules, to be described later, and outputs a CMYKW 1-bit ink dot control signal with the adjusted number of applications to the color printer 16.

The color printer 16 outputs a hard copy HC comprising a transparent sheet 62 such as a transparent resin sheet with a color image Ib thereon corresponding to the CMYKW 1-bit ink dot control signal supplied to the color printer 16 from the personal computer 12 through the interface 34.

Basically, the color printer 16 forms a W (white) image (solid image) representing a background color on the entire surface of the transparent sheet 62. In those areas of the transparent sheet 62 where the color image Ib is not formed, there is printed a W color image (solid image) by the color printer 16. The color printer 16 has a function to superimpose an ink of the same color respectively.

The image reproducing system 10 according to the present embodiment is basically constructed and operates as described above. Operation of the image reproducing system 10 which is carried out by the CPU 22 which functions as the function realizing means (function realizers) shown in FIG. 2 will be described below.

It is assumed that the color printer 16 is capable of forming a color image with inks using three or less of five colors C, M, Y, K, W on a transparent sheet (transparent base) by turning on and off dots (pixels) having a given size.

As shown in FIG. 2, the screening processor 54 performs a screening process on a supplied CMYK 8-bit signal to generate a CMYKW 1-bit pixel signal representing screening data. If the screening process comprises an error diffusion process, then the screening processor 54 produces multiple grayscale gradations based on the ratio of dot areas to a certain area as viewed macroscopically.

If the values "1" and "0" of the CMYKW 1-bit pixel signal correspond respectively to "ON" and "OFF" of an ink dot, then a CMYKW 1-bit ink dot control signal to be adjusted for its number of applications (referred to as a CMYKW 1-bit pixel signal since its contents are identical to those of the CMYKW 1-bit pixel signal representing screening data) is represented by a table 60 shown in FIG. 3.

As can be seen from the table 60, since a W color ink as applied to the transparent sheet 62 makes the transparent sheet 62 achromatic in white, it is considered to be represented by "1" (ON) in all representations of the CMYKW 1-bit pixel signal.

Specifically, as shown in FIG. 3, each of the representations of the CMYKW 1-bit pixel signal comprises a sequence of C, M, Y, K, W each indicated by either "1" (=ON) or "0" (=OFF).

For example, if C=W="ON" and M=Y=K="OFF", then the CMYKW 1-bit pixel signal is represented by "CMYKW"="10001", which corresponds to "2 COLORS" "10001 (CYAN)" in the second row of the table 60.

As shown in FIG. 3, the CMYKW 1-bit pixel signal can represent colors ranging from one color provided by the W color ink to five colors provided by the C, M, Y, K, W color inks. If one pixel is formed of one color, then one ink dot, i.e., one application, is required, and if one pixel is formed of five colors, then five ink dots, i.e., five applications are required. It can be understood that the total amount of color materials required per pixel to produce five colors is five times (500%) the total amount of a color material required per pixel to produce one color.

As described above, the color printer 16 is capable of forming a color image with three or less of five colors C, M, Y, K, W, i.e., a total amount of color materials up to three times (300%) the total amount of a color material required to produce one color, on a transparent sheet (transparent base) by turning on and off dots (pixels) having a given size.

Consequently, it is necessary to convert the CMYKW 1-bit pixel signal having the number of applications up to five for one pixel into a CMYKW 1-bit ink dot control signal whose number of applications has been adjusted, i.e., reduced (limited), to the number of applications up to three without the need for any color changes, according to a 1-bit value conversion table 56.

FIG. 4 shows details of the 1-bit value conversion table 56 for reducing (limiting) the number of applications (total-amount-of-color-material upper limit), which is up to five for one pixel, of a CMYKW 1-bit pixel signal, to be adjusted, to the number of applications up to three without the need for any color changes.

The CPU 22 determines the total amount of color materials (number of applications) provided by applying the W color material and the C, M, Y, K process color materials for each CMYKW 1-bit pixel signal representing screening data {total-amount-of-ink calculator (total-amount-of-color-material calculator), total-amount-of-ink calculating process (total-amount-of-color-material calculating process)}. Thereafter, if the total amount of inks to be applied is of a value of four times (400%) or five times (500%) that is in excess of a total-amount-of-ink upper limit of three times (300%) for the color printer (image output device) 16 for applying the inks per pixel, then the CPU 22 applies a first rule and a second rule, to be described below, to reduce the number of applications for the W color material or the C, M, Y, K process color materials without changing colors to three times (300%) or less according to the specifications, so that the total amount of inks will not exceed the total-amount-of-ink upper limit of three times (300%) (number-of-application adjuster, number-of-application adjusting process).

The 1-bit value conversion table 56 applies, to the CMYKW 1-bit pixel signal representative of four colors or more including the W color, the first rule which specifies that the three colors C, M, Y (gray color) shall be replaced with the color K and the second rule which specifies that for three or more of the four colors C, M, Y, K, no ink in the color W shall be applied as the transparent sheet 62 is not rendered transparent in the absence of the W color ink. The number of applications, or stated otherwise, the total amount of inks, can be reduced by applying the first rule and the second rule to the CMYKW 1-bit pixel signal.

As described above, the 1-bit value conversion table 56 shown in FIG. 4 represents the correspondence relationship between the CMYKW 1-bit pixel signal that is input to the 1-bit value conversion table 56 and the CMYKW 1-bit ink dot control signal serving as an output pixel signal that has been converted by the 1-bit value conversion table 56.

In FIG. 4, with respect to the range from a CMYKW 1-bit pixel signal "00001 (white)" to a CMYKW 1-bit pixel signal "00111 (yellow+black)" above the horizontal solid line, the number of applications (the amount of applied inks) is 3 times (300%) or less (the number of "1s" is three or less). Therefore, this range does not fall in either one of the first and second rules, and the CMYKW 1-bit pixel signal is directly used as the CMYKW 1-bit ink dot control signal, with the same sequences of the values.

A CMYKW 1-bit pixel signal "11101 (gray)" is a pixel signal representing four colors. Since this CMYKW 1-bit pixel signal falls in the first rule (including the gray of the three colors C, M, Y), the first rule is applied to replace "11101" with "00011". As the replaced pixel signal produced after the first rule has been applied includes one of the colors C, M, Y, K (C=M=Y=0, K=1), the second rule is not applied to the replaced pixel signal. Accordingly, the CMYKW 1-bit pixel signal "11101 (gray)" is converted into a CMYKW 1-bit ink dot control signal "00011". Though the number of applications of inks which corresponds to the total amount of color materials per pixel is reduced from four to two, there is no color change.

A CMYKW 1-bit pixel signal "11011 (blue+black)" is a pixel signal representing four colors, and does not fall in the first rule, meaning that nothing will change even if the first rule is applied thereto. Since it represents three of the colors C, M, Y, K, the second rule is applied to replace "11011" with "11010". Accordingly, the CMYKW 1-bit pixel signal "11011 (blue+black)" is converted into a CMYKW 1-bit ink dot control signal "11010". Though the number of applications of inks is reduced from four to three, there is no color change.

A CMYKW 1-bit pixel signal "11111 (gray+black)" is a pixel signal representing five colors, and falls in the first rule. The first rule is applied to convert it into a CMYKW 1-bit ink dot control signal "00021". Since the CMYKW 1-bit ink dot control signal "00021" includes the color K only, it does not fall in the second rule, and hence the second rule is not applied thereto. As described above, the numeral "2" of the CMYKW 1-bit ink dot control signal "00021" indicates that the K color ink is applied twice in the same pixel position. Accordingly, the CMYKW 1-bit pixel signal "11111 (gray+black)" is converted into the CMYKW 1-bit ink dot control signal "00021". The number of applications of inks is thus reduced from five to three.

According to the above embodiment, when the color image Ib is formed of pixels on the transparent sheet 62 using the W color ink and the C, M, Y, K process color inks, the application of the inks to form the image is controlled to prevent image formation problems which would be caused by applying pixels beyond a certain total amount of inks (the number of applications of three or 300%).

Specifically, after combinations of the W color ink and the C, M, Y, K process color inks are checked with respect to the CMYKW 1-bit pixel signal, the value of the CMYKW 1-bit ink dot control signal is determined by referring to the 1-bit value conversion table 56 which represents the correspondence relationship between the CMYKW 1-bit pixel signal and the CMYKW 1-bit ink dot control signal.

The 1-bit value conversion table 56 defines that the sum of the W color ink and the C, M, Y, K process color inks will not exceed a certain total-amount-of-ink upper limit (three times or 300%) with respect to all the combinations of the W color ink and the C, M, Y, K process color inks that are represented by the CMYKW 1-bit pixel signal.

Specifically, when the number of applications determined for a certain pixel is four, i.e., the W color ink is applied once and each of the C, M, Y process color inks is applied once, the number of applications is reduced to two, i.e., the W color ink is applied once and the K color ink is applied once. When the number of applications determined for a certain pixel is four, i.e., the W color ink is applied once, the K color ink is applied once, and two of the C, M, Y process color inks are applied once, the number of applications is reduced to three, i.e., the W color ink is not applied, but the K color ink is applied once, and two of the C, M, Y process color inks are applied once. When the number of applications determined for a certain pixel is five, i.e., the W color ink is applied once, and each of the C, M, Y, K process color inks is applied once, the number of applications is reduced to three, i.e., the W color ink is applied once, and the K color ink is applied twice. In this manner, the total amount of inks becomes equal to or smaller than the total-amount-of-ink upper limit (three times or 300%) by reducing the number of applications.

In the above embodiment, the input pixel signal comprises a CMYKW 1-bit pixel signal. However, the input pixel signal is not limited to a 1-bit signal (a binary signal), but may be a multivalued signal, for example. If the input pixel signal comprises a four-valued signal representing four states achieved by applying large and small dots in different ways, e.g., "not applying dots", "applying the small dot once", "applying the large dot once", and "applying the large dot twice", then the amount of inks used to apply the small dot may be half the amount of inks used to apply the large dot, and the application of the small dot may be expressed by "0.5" and the application of the large dot may be expressed by "1". In this manner, the above first and second rules based on the binary conditions for applying and not applying ink dots are made applicable.

For example, if CMYK=(0.5, 1, 0.5, 0), then when there is no difference between dot sizes, since C+M+Y+K+W=1+1+1+0+1>3 (300%), the W color ink is not applied. When there is a difference between dot sizes, since C+M+Y+K+W=0.5+1+0.5+0+1=3 (300%), the amount of inks is kept within the total amount of inks, and the amount of inks may be applied as it is. If CMYK=(0.5, 1, 0, 1), then since C+M+Y+K+W=0.5+1+0+1+1=3.5. In this case, the W color ink is not applied to achieve C'+M'+Y'+K'+W'=0.5+1+0+1+0=2.5.

If there is a difference between dot sizes, then the following aspects differ from the binary conditions for applying and not applying ink dots:

If C=M=Y=0.5, then K=0.5.

If CMYK=(1, 0, 0.5, 1), then C'M'Y'K'W'=(1, 0, 0.5, 1, 0). In other words, after the conversion, the large dot of cyan is applied once, the small dot of yellow is applied once, and the large dot of black is applied once.

If CMYK=(0.5, 0.5, 0.5, 1), then C'M'Y'K'W'=(0, 0, 0, 1.5, 1). In other words, after the conversion, the large dot of black is applied once, the small dot of black is applied once, and the dot of white is applied once.

If CMYK=(1, 0.5, 0.5, 1), then C'M'Y'K'W'=(0.5, 0, 0, 1.5, 1). In other words, after the conversion, the small dot of cyan is applied once, the large dot of black is applied once, the small dot of black is applied once, and the dot of white is applied once.

If CMYK=(1, 1, 0.5, 1), then C'M'Y'K'W'=(0.5, 0.5, 0, 1.5, 0). In other words, after the conversion, the small dots of cyan and magenta are applied once, the large dot of black is applied once, the small dot of black is applied once, and no dot of white is applied.

If the color printer 16 comprises a color printer using six process color materials such as light cyan (LC), light magenta (LM), cyan (C), magenta (M), yellow (Y), black (K), and the W color material, then the W color ink may be used or not used in the same manner as with the binary conditions for applying and not applying ink dots in C, M, Y, K, based on the idea that LC (light cyan) and C (cyan), and LM (light magenta) and M (magenta) have different concentrations, but have the same hues, and LC and C, and LM and M are not applied at the same time.

According to the above embodiment, the principles of the present invention are applied to the color printer 16 for forming, the color image Ib on the transparent sheet 62, using the W color ink as the background color ink and the C, M, Y, K process color inks, the color image Ib having colors determined by the total amount of color materials that are applied per pixel. The 1-bit value conversion table 56 determines the total amount (number of applications) of the W color ink and the C, M, Y, K process color inks that are to be applied per pixel, based on the CMYKW 1-bit pixel signal. Thereafter, if the determined total amount (number of applications) is of a value (four or more) in excess of the total-amount-of-ink upper limit for the color printer 16 for applying inks per pixel, then the number of applications of the W color ink or the CMYK process color inks is reduced to three or less without color changes, so that it will not exceed three corresponding to the total-amount-of-ink upper limit (number-of-application adjusting means). The present invention is thus capable of preventing image formation failures such as ink drooping and ink fixation failures when the color image Ib is formed on the transparent sheet 62.

The principles of the present invention are also applicable to an electrophotographic printer for forming a color image by applying toner images in C, M, Y, K.

Although a certain preferred embodiment of the present invention has been shown and described in detail, it should be understood that various changes and modifications may be made therein without departing from the scope of the appended claims.

What is claimed is:

1. An image processing method applicable to an image output device for forming a color image on a sheet with a background color material and process color materials, said color image having colors determined by a total amount of the color materials that are applied per pixel, said image processing method comprising:
a process of determining a total amount of the background color material and the process color materials which are to be applied per pixel based on an input pixel signal; and
a number-of-application adjusting process of, if the determined total amount of the color materials is of a value in excess of a total-amount-of-color-material upper limit for the image output device for applying the color materials per pixel, reducing the number of applications of the background color material or the process color materials without color changes, so that the total amount of the color materials is equal to or lower than said total-amount-of-color-material upper limit,
wherein if the determined total amount of the color materials is of a value equal to or less than the upper limit, the color materials of the background color material and the process color materials are added on without reducing the number of applications in the number-of-application adjusting process; and
further comprising:
a process of determining a number of applications of the process color materials;
wherein, in the number-of-application adjusting process, if the determined number of applications of the process color materials is three or more, said background color material is not applied;
wherein if said background color material comprises a white color material, said process color materials comprise C, M, Y, K color materials, and said total-amount-of-color-material upper limit represents a number-of-application upper limit of three, then when said number of applications determined for a certain pixel is four for applying the white color material once and applying each of the C, M, Y color materials once, said number-of-application adjusting process reduces the number of applications to two for applying the white color material once and applying the K color material once;
when said number of applications determined for a certain pixel is four for applying the white color material once, applying the K color material once, and applying two of the C, M, Y color materials once, said number-of-application adjusting process reduces the number of applications to three without adding the white color material; and
when said number of applications determined for a certain pixel is five for applying the white color material once and applying each of the C, M, Y, K color materials once, said number-of-application adjusting process reduces the number of applications to three for applying the white color material once and the K color material twice.

2. An image processing method according to claim 1, wherein said sheet comprises a transparent sheet, and said image output device comprises an ink jet printer or an electrophotographic printer.

3. An image processing apparatus applicable to an image output device for forming a color image on a sheet with a background color material and process color materials, said color image having colors determined by the total amount of the color materials that are applied per pixel, said image processing apparatus comprising:
means for determining a total amount of the background color material and the process color materials which are applied per pixel based on an input pixel signal; and
number-of-application adjusting means for, if the determined total amount of the color materials is of a value in excess of a total-amount-of-color-material upper limit for the image output device for applying the color materials per pixel, reducing the number of applications of the background color material or the process color materials without color changes, so that the total amount of the color materials is equal to or lower than said total-amount-of-color-material upper limit, and
means for determining a number of applications of the process color materials;
wherein, in the number-of-application adjusting means, if the determined number of applications of the process color materials is three or more, said background color material is not applied,
wherein if said background color material comprises a white color material, said process color materials comprise C, M, Y, K color materials, and said total-amount-of-color-material upper limit represents a number-of-application upper limit of three, then when said number of applications determined for a certain pixel is four for applying the white color material once and applying each of the C, M, Y color materials once, said number-of-application adjusting means reduces the number of applications to two for applying the white color material once and applying the K color material once;

when said number of applications determined for a certain pixel is four for applying the white color material once, applying the K color material once, and applying two of the C, M, Y color materials once, said number-of-application adjusting means reduces the number of applications to three without adding the white color material; and when said number of applications determined for a certain pixel is five for applying the white color material once and applying each of the C, M, Y, K color materials once, said number-of-application adjusting means reduces the number of applications to three for applying the white color material once and the K color material twice.

4. An image processing apparatus according to claim 3, wherein said sheet comprises a transparent sheet, and said image output device comprises an ink jet printer or an electrophotographic printer.

5. An image processing method applicable to an image output device for forming a color image on a sheet with a background color material and process color materials, said color image having colors determined by a total amount of the color materials that are applied per pixel, said image processing method comprising:

a process of determining a total amount of the background color material and the process color materials which are to be applied per pixel based on an input pixel signal;

a number-of-application adjusting process of, if the determined total amount of the color materials is of a value in excess of a total-amount-of-color-material upper limit for the image output device for applying the color materials per pixel, reducing the number of applications of the background color material or the process color materials without color changes, so that the total amount of the color materials is equal to or lower than said total-amount-of-color-material upper limit; and a process of determining a number of applications of the process color materials;

wherein, in the number-of-application adjusting process, if the determined number of applications of the process color materials is three or more, said background color material is not applied, wherein if said background color material comprises a white color material, said process color materials comprise C, M, Y, K color materials, and said total-amount-of-color-material upper limit represents a number-of-application upper limit of three, then when said number of applications determined for a certain pixel is four for applying the white color material once and applying each of the C, M, Y color materials once, said number-of-application adjusting process reduces the number of applications to two for applying the white color material once and applying the K color material once;

when said number of applications determined for a certain pixel is four for applying the white color material once, applying the K color material once, and applying two of the C, M, Y color materials once, said number-of-application adjusting process reduces the number of applications to three without adding the white color material; and when said number of applications determined for a certain pixel is five for applying the white color material once and applying each of the C, M, Y, K color materials once, said number-of-application adjusting process reduces the number of applications to three for applying the white color material once and the K color material twice.

* * * * *